United States Patent [19]

Trevorrow

[11] 4,054,436
[45] Oct. 18, 1977

[54] CONTAMINANT DIVERTING THRESHOLD FOR DELIVERING MOLTEN SHEET GLASS TO A GLASS FORMING CHAMBER AND METHOD THEREOF

[75] Inventor: Thomas R. Trevorrow, Ford City, Pa.

[73] Assignee: PPG Industries, Inc., Pittsburgh, Pa.

[21] Appl. No.: 767,253

[22] Filed: Feb. 10, 1977

[51] Int. Cl.² ............................................. C03B 18/02
[52] U.S. Cl. .................................. 65/65 A; 65/99 A; 65/182 R; 65/196
[58] Field of Search ................ 65/65 A, 25 A, 99 A, 65/182 R, 99 R, 196

[56] References Cited

U.S. PATENT DOCUMENTS

| 710,357 | 9/1902 | Heal | 65/182 |
|---|---|---|---|
| 789,911 | 5/1905 | Hitchcock | 65/32 |
| 1,609,999 | 12/1926 | Ferngren | 65/196 |
| 3,083,551 | 4/1963 | Pilkington | 65/99 |
| 3,220,816 | 11/1965 | Pilkington | 65/65 |
| 3,843,345 | 10/1974 | Harrell et al. | 65;65/65;65 A |
| 3,843,346 | 10/1974 | Edge et al. | 65/99 |
| 3,884,665 | 5/1975 | Edge et al. | 65/95 |

Primary Examiner—Arthur D. Kellogg
Attorney, Agent, or Firm—E. Kears Pollock

[57] ABSTRACT

A flat glass manufacturing facility is provided with a threshold for supporting and delivering a layer of molten glass from a glassmaking furnace to a glass forming chamber containing a pool of glass-supporting molten metal wherein the threshold has an upper glass-supporting surface having one or more transverse grooves, each of which extends from an upstream point near the center of the threshold outwardly to the sides of the threshold and in a direction that is oriented slightly in the direction of the glass delivery over the threshold in order to divert a small portion of molten glass in the lowermost part of the delivered layer of glass to the marginal regions of the delivered layer of glass whereby small bubbles or seeds, products of reaction or other contaminants may be diverted from the main portion of the glass to its marginal portions.

10 Claims, 4 Drawing Figures

CONTAMINANT DIVERTING THRESHOLD FOR DELIVERING MOLTEN SHEET GLASS TO A GLASS FORMING CHAMBER AND METHOD THEREOF

BACKGROUND OF THE INVENTION

1. Field of the Invention

This invention relates to an apparatus for the manufacture of a continuous sheet of flat glass by supporting molten glass on a pool of molten metal while forming and cooling the glass. More particularly, this invention relates to an apparatus and method for delivering molten glass onto such a pool of molten metal for forming.

2. Description of the Prior Art

Molten glass may be delivered onto molten metal and formed into a continuous sheet or ribbon of glass according to the teachings of Heal, U.S. Pat. No. 710,357 or of Hitchcock, U.S. Pat. No. 789,911; or according to the teachings of Pilkington, U.S. Pat. No. 3,083,551 and U.S. Pat. No. 3,220,816; or according to the teachings of Edge and Kunkle, U.S. Pat. No. 3,843,346. According to the teachings of Heal, Hitchcock and Edge and Kunkle, molten glass is delivered over a rigid element and directly onto a glass-supporting pool of molten metal, while according to the teachings of Pilkington, molten glass is delivered over a rigid element and then allowed to fall freely onto a glass-supporting pool of molten metal where it spreads rearwardly and outwardly along the surface of the pool of molten metal. The rigid element which supports glass during its delivery is generally a refractory element. In the device of Hitchcock, it is merely an upper part of a separating wall. According to the teaching of Heal, it is a refractory bridge. According to the teachings of Pilkington, the refractory support is a refractory canal terminating in a refractory lip suspended above and overlying a pool of molten metal. According to the patent of Edge and Kunkle, glass is supported by a refractory threshold which has a glass-supporting surface extending into contact with the pool of molten metal onto which glass is to be delivered.

According to the patent of Pilkington, the glass which contacts the refractory piece upon which it is supported during delivery may be contaminated by that refractory piece due apparently to either erosion or corrosion of the refractory piece by the hot molten glass which is moving over it. The invention of Pilkington is directed toward minimizing bottom surface defects characterized as linear defects oriented along the direction of glass movement by providing a molten glass flow regime which permits the bottom, refractory-contacting portion of the delivered layer or stream of glass to flow rearwardly then outwardly into the marginal portions of the advancing layer of glass which is ultimately cooled and attenuated to form a continuous ribbon or sheet of flat glass.

According to U.S. Pat. No. 3,884,665 of Edge and Kunkle, molten glass may be delivered directly over a refractory threshold without creating undesirable bottom defects in glass. This is possible if the refractory threshold is provided with an upper glass-supporting surface that is convex in shape and particularly if the threshold is made of materials such as substantially pure silica or alumina. Further, U.S. Pat. No. 3,884,665 teaches that refractory markings may be further minimized by appropriate thermal control of a threshold over which molten glass is delivered for forming.

It is recognized that not all defects that are found at or near the bottom surface of a sheet or ribbon of glass are caused by reaction with or contamination by a refractory over which glass is delivered immediately prior to being delivered onto and supported by a pool of molten metal upon which it is formed. It is possible to have defects which derive from sources within a glassmaking furnace. A typical defect source may be a collection or buildup of devitrified glass or other contaminating material in a furnace, particularly in a portion of a furnace immediately upstream of a threshold or other delivery facility. It is further recognized that gases may be caused to transpire through relatively porous refractories into molten glass due to a thermal transpiration effect so that small seeds or bubbles of gas may be present in freshly delivered molten glass. Such seeds or bubbles would likely be in the lowermost portion of a layer of molten glass being delivered over a surface of a refractory member such as a threshold onto molten metal for forming. Bubbles of gas may have insufficient free energy to free themselves from such a surface and drift upwardly through the molten glass prior to its delivery from a refractory piece. Nevertheless, the moving layer of glass may provide sufficient energy to drag the bubbles from the surface of the refractory and carry them along with it. Since glass cools relatively rapidly immediately upon its delivery onto a pool of molten metal for forming, any bubbles of gas which enter the glass may not rise sufficiently fast to move through or into the body of glass itself but may exist near and at the bottom surface of the glass. They could then be evident as open bubbles in the bottom surface of the finished glass having been held in that position due to the rapidly increasing viscosity of the glass itself.

The present invention contemplates a modification to a molten glass delivery facility in order to prevent bubbles or seeds of gas or other contaminants from affecting and detracting from the overall quality of a major portion of the bottom surface of a sheet or ribbon of glass produced by flotation on molten metal following its delivery thereto by a direct delivery technique such as delivery over a threshold.

SUMMARY OF THE INVENTION

A molten glass delivery facility joins a glassmaking furnace at its refiner or conditioner end to the inlet or upstream end of an enclosed glass forming chamber which contains a pool of molten metal. The molten glass delivery facility includes a threshold, preferably comprising a refractory member or a member comprising a plurality of refractory pieces joined together. The threshold serves to support molten glass during its delivery from the glassmaking furnace onto the surface of the pool of molten metal within the glass forming chamber. At the ends of the threshold are side members for constraining the molten glass to a defined path of delivery. Extending over the threshold and extending downwardly between the side members so that it is in facing relation to the threshold is a metering member or tweel.

According to this invention, the threshold has at least one transverse groove in its upper glass-supporting surface. The groove extends from a point in the vicinity of the center of the threshold midway between the side members outwardly toward each of the side members. The outwardly extending portions of the groove are oriented at an obtuse angle with respect to each other. The angle enclosed is less than 180°, preferably less than 160°, and, in general more than 120°. Although the lower limit is not particularly critical in a process sense, it is somewhat constrained only by the convenience of having the legs of the angle reside completely within the width of threshold which is exposed for supporting molten glass during its delivery. The space enclosed by the angle faces in the direction of glass movement during is delivery, namely toward the pool of molten metal in the forming chamber or in a downstream direction. Thus, the angle has a point, which points in an upstream direction or toward the conditioner of the glassmaking furnace and away from the direction of glass movement.

The groove has a sufficient width and depth for diverting glass flowing along the glass-supporting surface of the threshold toward the side members. It is sized to divert a sufficient amount of glass so that flat glass formed following delivery of the molten glass over the threshold onto the molten metal has a bottom suface that is free from visually observable bottom surface markings, particularly bottom surface markings that are linearly disposed and aligned with the path of glass advance. In general, molten glass which has been delivered over the threshold employed in this invention should also be free of open bubbles or seeds in its bottom surface. When referring to the quality of the glass produced according to the proposed use of this invention, the central ninety per cent of the width of glass produced is referred to since the invention itself is directed toward diverting the defect-causing bubbles and contaminants into the outer marginal portions of the glass. The marginal portions desirably embrace no more than five percent of the width of the ribbon or sheet along each of its sides.

Preferred embodiments of the invention employ thresholds having a plurality of grooves with the grooves arranged in nested, substantially parallel arrangement. A plurality of grooves has the appearance of a chevron when looking at the threshold in plan view with the angles of the chevron pointing toward the refiner or conditioner of the glass-making furnace and away from the direction of glass movement over the threshold.

Since contaminants and bubbles near the bottom of a layer of molten glass are forced into a groove and along that groove to divert them from a central portion of the advancing glass into its marginal portions, it is thought convenient to provide at least the central portion of the groove beneath the metering member or tweel where glass is inherently forced through a constricted space and is more conveniently forced in its lowermost portion into the groove.

In a particularly preferred embodiment the apparatus employs a threshold having a convex upper face like that disclosed in U.S. Pat. No. 3,884,665 with the upper vace having an upstream face with faces the conditioner of the glassmaking furnace, a top face which may be horizontal and which faces the metering member or tweel and a downstream face which engages the pool of molten metal in the forming chamber. In such an embodiment of the invention, the threshold groove extends outwardly from the center point that is in the top face of the threshold and preferably beneath and in facing relation to the tweel or metering member, with the groove extending outwardly in both directions toward the front face of the threshold into the vicinity of the side members. In a particularly preferred embodiment, the groove extends outwardly from the top face through marginal portions of the front face and towards the side members. The dragging action of the advancing molten glass in the marginal portions of the delivered layer of glass over the grooves, which extend into the front face which is sloped downwardly, is believed to increase the rate of flow into and along the grooves so that the rate of diversion of molten glass is believed to be increased when employing a threshold according to this embodiment of this invention. It is, of course, particularly preferred in this and other embodiments of this invention that the center point of the threshold groove and a portion of each of is outwardly extending portions are in the top face of the threshold and are beneath and in facing relation to the metering member or tweel.

This invention provides a method of delivering a layer of molten glass over a threshold onto a pool of molten metal which includes a step of diverting a small effective amount of the molten glass from the lowermost central portion of the layer being delivered toward and into two lowermost marginal portions of that layer. The diversion of that molten glass from the central portion of the layer of glass and into its marginal portions occurs substantially immediately prior to the advance of the marginal portions of glass onto the pool of molten metal in the forming chaber. Thereafter the glass which has been diverted, if it contains contaminants deriving from any source, may be cut from the finished ribbon of glass after it has formed and annealed so that the removed glass will contain the contaminants. This removed glass may be recycled to the furnace as cullet where the inhomogeneities of contaminants may be homogenized into successive batches of glass within the furnace.

It is believed particularly desirable to adjust and control the temperature of the molten glass during its delivery. The adjustment and maintenance of the temperature of molten glass during its delivery is, of course, not new per se. However, in the practice of this invention the adjustment and maintenance of the temperature within a range of temperatures to provide a sufficiently low glass viscosity to insure the diversion of lowermost portion of glass is thought to be particularly desired. The temperature of the molten glass should be controlled within the range of from 1900° to 2150° F. (1035° to 1175° C.), and it is desired to make the temperature of the glass as uniform as possible across the width of the threshold.

While it has been appreciated in the past that molten glass in the conditioner or refiner of a glassmaking furnace could be diverted into marginal regions by floating barriers or otherwise supported diverting barriers, it is interesting to note that the diversion accomplished in the practice of this invention appears to be best accomplished during delivery by providing grooves or channels which have elevations below the general elevation of the layer of glass being delivered and from which diversion of molten glass is desired. The reason for this is not known, but scale modeling employing physical models appears to confirm that diversion of molten glass will be more effective by employing grooves or channels described here than by using dams or other elevated barriers.

As previously discussed with reference to the apparatus aspects of this invention, the diversion of molten glass appears to be best accomplished by engaging the layer of molten glass with a groove or channel for receiving a lowermost portion of molten glass to be diverted. This is best accomplished in a region where there is the greatest glass flow rate. Such a region is that region where the flow of glass is most constricted beneath a metering member or tweel. Thus, it is believed to be a particularly preferred embodiment of this invention to initiate diversion of the lowermost portion of the layer of molten glass which is being delivered in a region of greatest glass flow where the cross-sectional area of glass flow is limited by metering.

This invention may be further appreciated with reference to the accompanying drawings in which identical reference numbers indicate identical parts.

DESCRIPTON OF THE PREFERRED EMBODIMENTS

Figure 1:
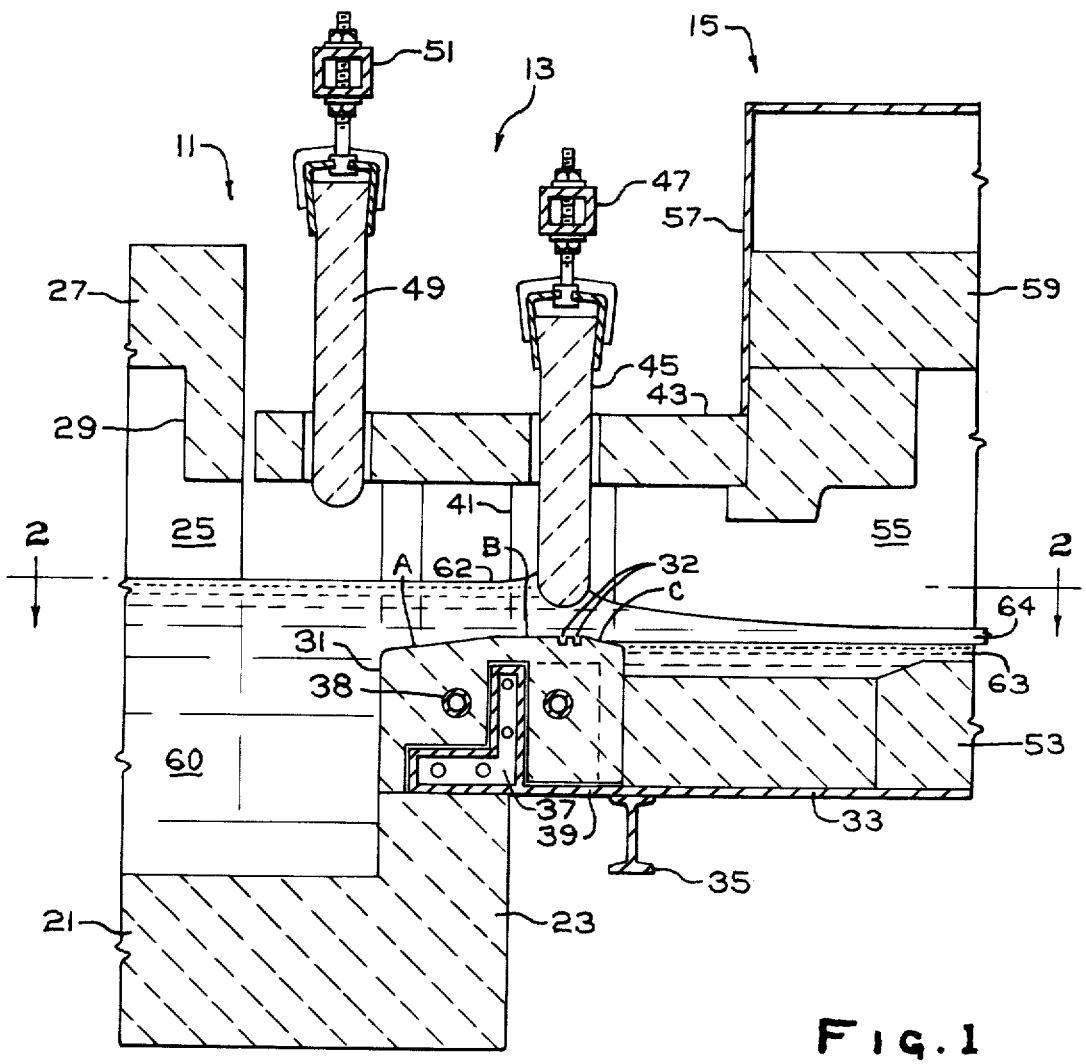
FIG. 1 is a longitudinal, sectional elevational view of a molten glass delivery facility connecting a glass conditioner to a glass forming chamber showing the grooved threshold according to this invention.

Referring now to the drawings, there is shown a glassmaking facility including a glassmaking furnace and a glass forming chamber. The glassmaking furnace terminates in a refiner or conditioner 11 which is connected through a molten glass delivery facility 13 to an enclosed glass forming chamber 15.

The refiner or conditioner 11 includes a bottom 21, a front basin wall 23, side walls 25, a roof 27 and an upper front wall 29.

The molten glass delivery facility 13 includes, as a principal element, a threshold 31 having angular grooves 32 in its upper surface. The threshold illustrated includes an upstream face A, a top face B, in which the grooves 32 are located, and a downstream face C. The threshold 31 rests on a bottom casing 33 which, in turn, is supported by structural support 35 and other structural supports (not shown). The casing 33 provides a bottom casing for the forming chamber 15 in addition to serving a support for the threshold 31. The delivery facility 13 further includes a cooler 37 extending through the threshold 31. The cooler 37 provides for positive containment of molten metal within the forming chamber. A plurality of thermal control elements 38 which may be heaters, but are preferably coolers, extend through the threshold 31 and provide means for adjusting and maintaining the temperature of molten glass advancing over the threshold during delivery. A seal of impervious material 39 may be provided about the bottom portion of the threshold 31 to prevent or at least minimize the ingress of air through the threshold into the vicinity of the molten glass delivered over it.

Side members or jambs 41 extend upwardly at each end of the threshold 31 and provide constraint against the outward flow of molten glass as it passes over the threshold 31 and immediately as it is delivered onto molten metal in the forming chamber. A roof or flat arch 43 is spaced above the threshold and extends over it from one side member 41 to the other and from the front wall 29 of the glassmaking furnace to the inlet or hot end of the forming chamber 15. Openings are provided through the roof 43 for receiving metering members or tweels.

An operating tweel 45 extends downwardly through one opening and transversely across the space above the threshold 31 between the side members or jambs 41. The operating tweel 45 is connected to an elevating assembly 47 (not fully shown) for raising and lowering the tweel 45. By adjusting the height of tweel 45, an opening of desired size is defined by the bottom of the tweel 45, the top of the threshold 31 and the inside faces of the side members 41 to control the rate of molten glass delivery over the threshold. A backup tweel 49 is provided upstream of the threshold extending across the width of the delivery facility down through an opening in the roof 43. Backup tweel 49 is suspended from an elevated mechanism 51 (not fully shown) for raising and lowering it. Backup tweel 49 may be lowered to completely cut off the flow of molten glass during times when a threshold or operating tweel must be replaced or repaired as part of routine maintenance.

The forming chamber 15 includes a refractory bottom liner 53 resting on the casing 33 and side casing 54 extending upwardly about the forming chamber and enclosing it. A refractory liner 55 is disposed within the side casing 54. An upper casing 57 surrounds and encloses the upper portion of the forming chamber. A refractory roof or ceiling 59 is spaced above and extends over the lower portion of the forming chamber and separates the chamber into two portions: a headspace beneath the roof or ceiling 59 and a service space above the roof or ceiling 59 and inside the upper casing 57.

During operation, a pool of molten glass 60 is maintained within the glassmaking furnace 11 by melting raw batch material and cullet to continuously provide a source of molten glass. Molten glass in the pool 60 of molten glass is caused to flow in its upper portion toward the delivery facility 13, and a layer 62 of molten glass is continuously withdrawn from the upper portion of the pool 60 and advanced over the threshold 31 beneath the tweel 45 and onto a pool or bath of molten metal 63, preferably tin, maintained inside the forming chamber 15. The delivered layer of molten glass is advanced along the surface of the pool of molten metal 63 and cooled to form a continuous sheet or ribbon of glass 64 which may be withdrawn from the forming chamber and further cooled and annealed for cutting and further processing to provide flat glass articles such as windows, mirrors, laminated glass articles, coated glass articles and the like.

Figure 2:
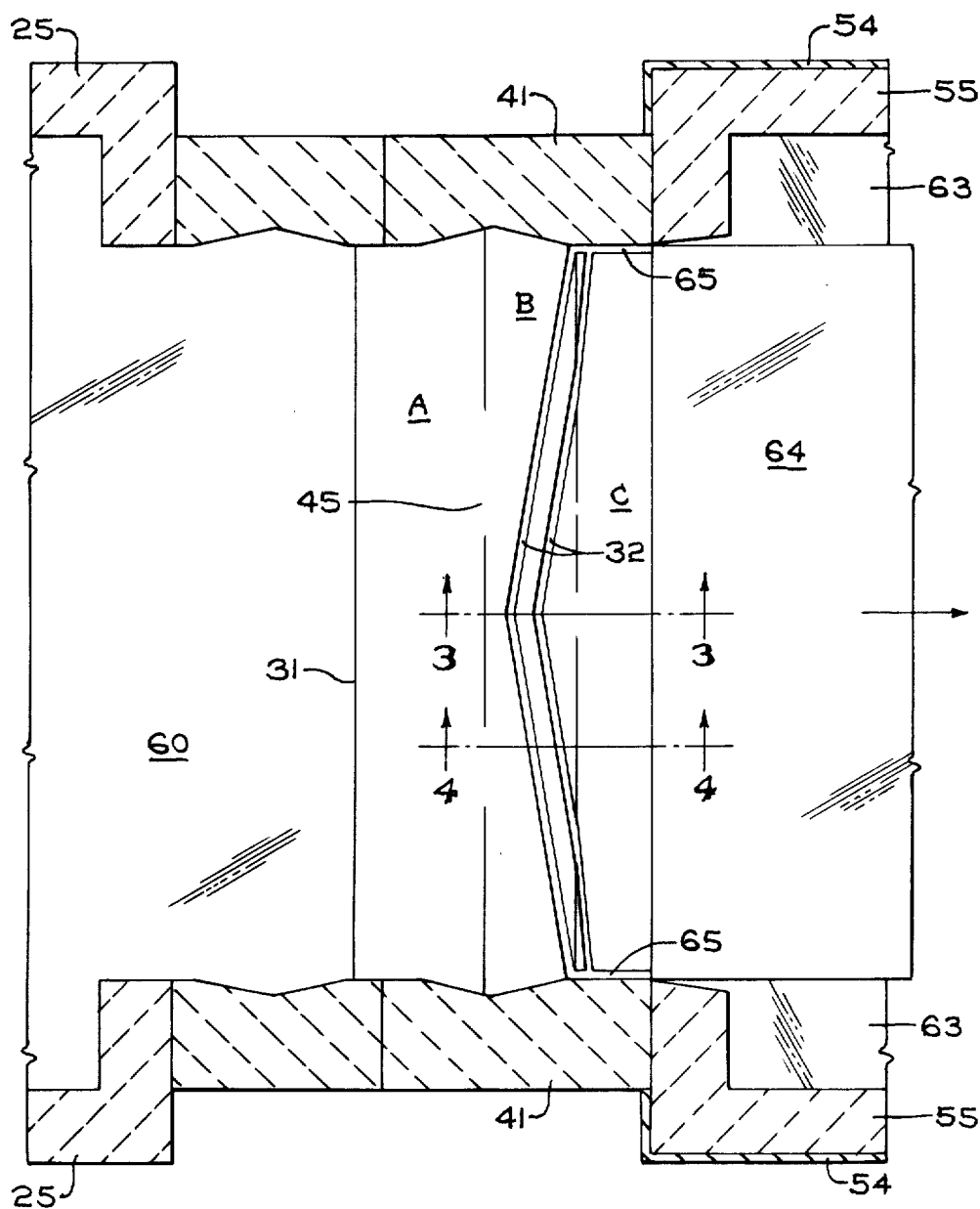
FIG. 2 is a horizontal, sectional plan view taken along section line 2—2 of FIG. 1.

Looking now particularly at FIG. 2, there are illustrated two grooves 32 which are in nested relation and form a chevron pattern having its point towards the upstream part of the threshold 31 and away from the direction of glass advance as illustrated by the arrow to the right in FIG. 2. The illustrated groove shown to the left in FIG. 2 is entirely within the top face B of the threshold. It extends from a central point outwardly to each side member 41 and 41', and in a slightly downstream direction (that is, to the right of FIG. 1, which is the direction of glass movement or advance). Virtually all of this groove, which is the upstream groove of the pair, is beneath the tweel 45.

The downstream groove of the pair illustrated in FIG. 2 (that is, the groove to the right in FIG. 2) has its center point and central portion on the top face B of the threshold but extends at its marginal portions into and partially along the downstream face C of the threshold. A pair of longitudinal grooves 65 may be provided in the upper surface of the threshold 31 near the side members or jambs 41 to enhance the reintroduction of molten glass from the grooves 32 into the marginal portions of the advancing layer 62 of glass.

Figure 3:
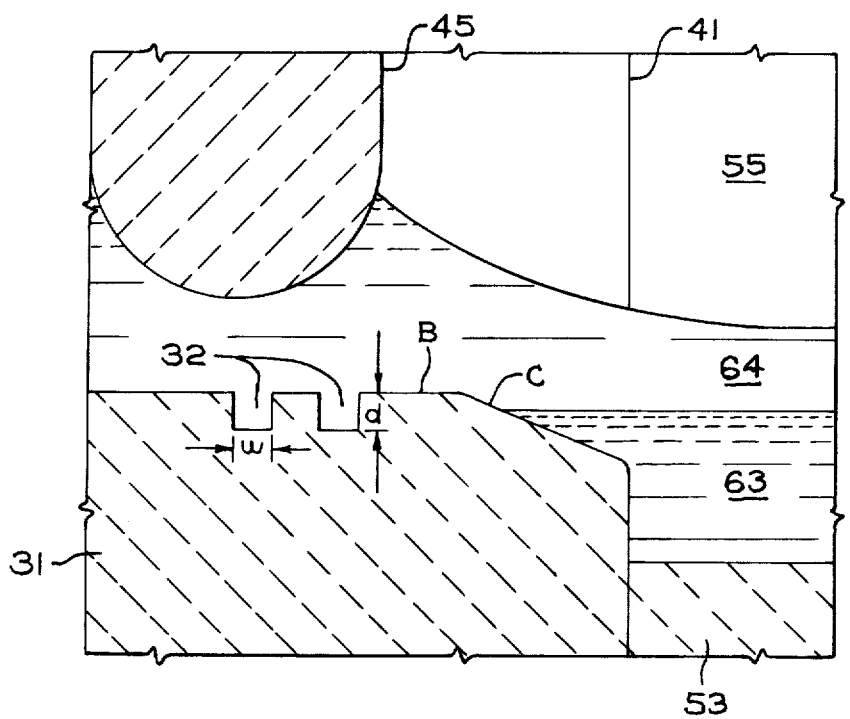
FIGS. 3 and 4 are respectively enlarged detail, partial, sectional, longitudinal elevations taken along section lines 3—3 and 4—4 respectively of FIG. 2 with the area of detail highlighted in FIG. 1.
Figure 4:
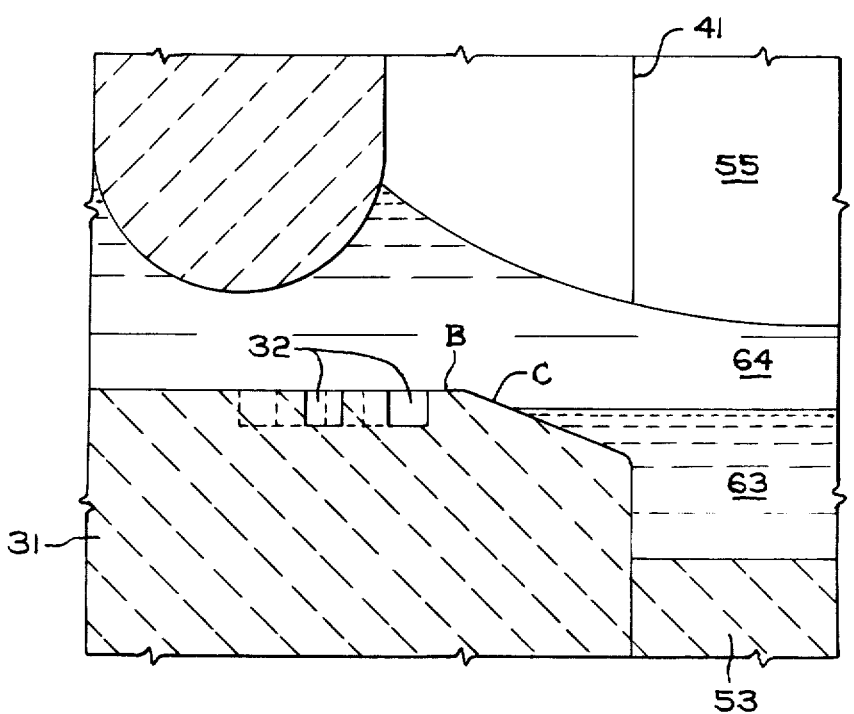

As illustrated in FIGS. 3 and 4, each groove has a depth D and width W. The depth D preferably ranges from 0.5 inch to 3 inches (1.25 to 7.6 cm) in a conventional commercial unit size having a threshold length of from 120 to 200 inches (3 to 5 meters). The width W preferably ranges from 0.5 inch to 6 inches (1.25 to 15.2 cm) and more preferably from 0.5 inch to 3 inches (1.25 to 7.6 cm). In general, the depth of a groove is believed to be best if it is within a range from 1/12 to ½ times the anticipated average depth of molten glass over the threshold during operation, that is, the spacing intended between the bottom of the tweel 45 and the top face of the threshold 31 should be 4–10 inches (10.2 to 25.4 cm) when using a threshold of the size just described.

In many respects the present invention acts like a Mitchell bearing in causing entrapped gases to be forced into the marginal portions of an advancing layer of glass. As glass is forced through a constricted region between the theshold and tweel, the grooves serve as regions where the glass experiences less shear than in the stream at the surface of the threshold itself so that bubbles of gas which cannot support a shear force tend to accumulate and flow along with the glass in the grooves into the marginal portions of the advancing layer of glass.

All preferred dimensions and performance expectations stated for this invention are based upon operation of a 1/21 scale model employing an organic analogue to simulate molten glass. Past experience with similar models would indicate that performance of molten glass systems would follow a similar performance pattern.

While this invention has been described with reference to several preferred embodiments for the purpose of illustration, those skilled in the art will be able, on the basis of this disclosure, to devise other embodiments which are variations from those described yet within the scope of this invention as defined in the following claims. I claim:

1. In an apparatus for delivering a layer of molten glass onto a pool of molten metal for forming flat glass comprising a threshold for supporting the molten glass during its delivery, side members for constraining the molten glass to a defined path of delivery and a movable metering member extending between the side members and in facing relation to the threshold, the improvement which comprises a threshold having at least one transverse groove in its upper glass-supporting surface which extends from a point in the vicinity of the center of the threshold outwardly toward each of the side members, the outwardly extending portions of the groove being oriented at an abtuse angle of less than 180° with respect to each other which angle faces in the direction of glass delivery toward the pool of molten metal; said groove being of sufficient width and depth for diverting a sufficient amount of glass flowing along the glass-supporting surface of the threshold toward the side members to free flat glass formed following delivery over the threshold of visually observable bottom surface marking that is linearly disposed and aligned with the direction of glass advance during forming.

2. The apparatus according to claim 1 wherein a plurality of grooves are provided in the threshold, the grooves being arranged in a nested, substantially parallel arrangement.

3. The apparatus according to claim 1 wherein the threshold groove has its center point at a location beneath and in facing relation to the metering member.

4. The apparatus according to claim 1 wherein the threshold has a convex upper face comprising a top face and a downstream face which engages the pool of molten metal and the threshold groove extends outwardly from a center point in the top face toward the front face.

5. The apparatus according to claim 4 wherein the groove extends outwardly from the top face through marginal portions of the front face toward the side members.

6. The apparatus according to claim 5 wherein the center point of the threshold groove and at least a portion of each of its outwardly extending portions are in facing relation to the metering member.

7. In a method of delivering a layer of molten glass over a threshold onto a pool of molten metal for forming flat glass, the improvement which comprises diverting a small effective amount of the molten glass from a lowermost central portion of the layer being delivered toward andinto two lowermost marginal portions of the layer being delivered substantially immediately prior to the advance of the marginal portions onto the pool of molten metal.

8. The method according to claim 7 wherein the temprature of the molten glass during delivery is adjusted and maintained within a range of temperature to provide a sufficiently low glass viscosity to insure the diversion of the lowermost portion of molten glass.

9. The method according to claim 8 wherein the lowermost portion of molten glass is diverted by engaging outwardly extending flow channels having elevations below the general elevation of the threshold.

10. The method according to claim 8 wherein the diversion of a lowermost portion of the layer of molten glass is initiated in a region of greatest glass flow rate where the cross-sectional area for glass flow is limited by metering.

* * * * *